(12) United States Patent
Embler

(10) Patent No.: US 8,745,819 B2
(45) Date of Patent: Jun. 10, 2014

(54) LOAD SUSTAINING BUSHING

(75) Inventor: Jonathan David Embler, Tustin, CA (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 13/299,404

(22) Filed: Nov. 18, 2011

(65) Prior Publication Data

US 2013/0125340 A1    May 23, 2013

(51) Int. Cl.
*F16L 5/00*    (2006.01)
(52) U.S. Cl.
USPC .................................... 16/2.1; 16/2.2; 16/2.4
(58) Field of Classification Search
USPC ........ 16/2.1–2.5; 384/278, 905; 280/124.133; 267/269, 270, 276, 281
See application file for complete search history.

(56) References Cited

U.S. PATENT DOCUMENTS

| | | | | | |
|---|---|---|---|---|---|
| 771,495 | A | * | 10/1904 | Pfluger | 16/2.4 |
| 944,384 | A | * | 12/1909 | Speker et al. | 16/2.4 |
| 3,133,769 | A | * | 5/1964 | Drake | 384/145 |
| 3,512,328 | A | * | 5/1970 | Eriksson | 52/787.1 |
| 3,633,951 | A | | 1/1972 | Hinkle et al. | |
| 6,082,721 | A | * | 7/2000 | Kingsley | 267/276 |
| 6,268,565 | B1 | * | 7/2001 | Daoud | 174/657 |
| 6,553,615 | B1 | * | 4/2003 | Hansen et al. | 16/2.1 |
| 6,812,406 | B2 | * | 11/2004 | Hand | 174/667 |
| 6,942,452 | B2 | * | 9/2005 | Bruno et al. | 415/135 |
| 6,974,290 | B2 | * | 12/2005 | Pountney | 411/384 |
| 7,178,325 | B2 | | 2/2007 | Arbona | |
| 7,825,331 | B2 | * | 11/2010 | Allais et al. | 174/15.4 |
| 2004/0111829 | A1 | * | 6/2004 | Bruno et al. | 16/2.2 |
| 2005/0125946 | A1 | | 6/2005 | Sucic et al. | |
| 2008/0250603 | A1 | * | 10/2008 | Skinner et al. | 16/2.2 |
| 2009/0265885 | A1 | * | 10/2009 | Robertson et al. | 16/2.1 |
| 2011/0008125 | A1 | | 1/2011 | Moon et al. | |
| 2012/0235407 | A1 | * | 9/2012 | Blackie et al. | 285/398 |
| 2012/0317789 | A1 | * | 12/2012 | Moon et al. | 29/525.11 |

OTHER PUBLICATIONS

Shur-Lok, "Adjustable Spacers for All Type Panels," Fasteners for Sandwich Structure Catalog, p. 17, Oct. 9, 1999.
Shur-Lok, "Adustable Spacers for All Type Panels," Fasteners for Sandwich Structure Catalog, p. 21, Jul. 8, 1999.
European Search Report dated Mar. 6, 2013 in EP Application No. 12192851.9-1758.

* cited by examiner

*Primary Examiner* — Victor Batson
*Assistant Examiner* — Matthew Sullivan
(74) *Attorney, Agent, or Firm* — Hope Baldauff, LLC

(57) ABSTRACT

Apparatus and methods provide for a bushing that compensates for thermal expansion and contraction to maintain a preload on a corresponding structure at various operating temperatures. According to embodiments described herein, a bushing may include two bushing components coupled to a load compensation sleeve between the two bushing components. The load compensation sleeve may have a coefficient of thermal expansion (CTE) greater than the two bushing components and the corresponding abutting structure. The configuration of the bushing components and load compensation sleeve, along with the corresponding CTE characteristics, maintains the preload imposed by the two bushing components on the structure throughout operations at various temperatures.

15 Claims, 5 Drawing Sheets

LOAD SUSTAINING BUSHING

FIELD OF THE DISCLOSURE

This disclosure relates to bushings and more particularly to the control of the thermal expansion and contraction of bushings during operation over a range of temperatures.

BACKGROUND

Bushings are commonly used in many different applications. One example includes the use of bushings with composite sandwich materials, such as a ceramic matrix composite (CMC) or polymer matrix composite (PMC) material, when joining or attaching the composite sandwich structure to another structural component. High temperature CMC structures may include a ceramic composite having a laminated face sheet with a core material. CMC structures carry in-plane loads well, but are not well suited for handling point loads, such as at locations where a fastener is needed. Bushings are useful in these areas to increase the bearing area over which the fastener load can be distributed.

Many conventional bushings are metallic. Metals often have a significantly higher coefficient of thermal expansion (CTE) than the ceramic or polymer composite material to which the bushing is attached. As a result, when using a conventional metallic bushing that is installed through the thickness of a composite sandwich structure in order to secure the sandwich structure to another component, the metallic bushing will expand more than the composite sandwich structure as the assembly heats. This thermal expansion differential between the bushing and the sandwich structure creates an undesirable looseness in the bushing with respect to the sandwich structure as the bushing expands a greater amount for a given rise in temperature than the composite material. Conversely, a drop in temperature can cause the bushing to shrink more than the sandwich structure causing an adverse increase in bushing clamp load.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods provide for utilizing a bushing with a load compensation sleeve to maintain a preload imposed on a corresponding structure during operations at various temperatures. According to one aspect of the disclosure provided herein, a bushing may include two bushing components coupled to a load compensation sleeve. The load compensation sleeve has a CTE that is greater than the CTE of the two bushing components. The bushing components and load compensation sleeve are configured so that axial expansion of the load compensation sleeve maintains a distance between the two bushing components over a range of operational temperatures.

According to another aspect, a bushing may include an inner bushing component, an outer bushing component, and a load compensation sleeve positioned between and coupled with the two bushing components. The inner bushing component has an inner wall and a clamp tab extending perpendicularly from the inner wall. Similarly, the outer bushing component has an outer wall with a clamp tab extending perpendicularly from the outer wall and parallel to the clamp tab of the inner bushing component to create a bushing clamp length between the two clamp tabs. The outer wall is sized to encompass the inner wall when positioned around the inner bushing component. The load compensation sleeve has a CTE that is greater than a CTE of the inner bushing component and of the outer bushing component.

According to yet another aspect, a method for utilizing a load sustaining bushing may include coupling a first bushing component to a load compensation sleeve. The first bushing component and load compensation sleeve are inserted into an aperture of a structure. A second bushing component is coupled to the load compensation sleeve so that the first bushing component and the second bushing component abut opposing surfaces of the structure to create a preload that is substantially maintained during thermal expansion of the first bushing component, the second bushing component, the load compensation sleeve, and the structure.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to apparatus and methods for utilizing a bushing having a load compensation sleeve to maintain a substantially constant load on a corresponding structure while heating or cooling. As discussed briefly above, conventional bushings are commonly made from metal and other materials having a higher coefficient of thermal expansion (CTE) than the composite or other materials through which the bushings are installed. For the purposes of this disclosure, various embodiments may be described in the context of the use of a bushing with a composite sandwich material, such as a ceramic matrix composite (CMC) or polymer matrix composite (PMC) material. It should be appreciated, however, that the load sustaining bushings described herein may be utilized with any composite or non-composite materials having a CTE that could allow for undesirable looseness, or slop, between the material and a conventional bushing having a comparatively higher CTE within a high temperature environment, or an undesirable increase in the load applied by the bushing on the material when subjected to lower temperature environments.

In order to reduce or eliminate the slop between the bushing and the composite sandwich material that is induced during high temperature operations and the compression of the bushing against the composite sandwich material during low temperature operations, the disclosure herein provides a load sustaining bushing that maintains a longitudinal length, or depth, when operating within an environment with a varying range of temperatures. According to various embodiments described below, the load sustaining bushing may include a load compensation sleeve positioned between two bushing components. The load compensation sleeve includes a higher CTE than the other bushing components, and a higher CTE than the composite sandwich material. The load compensation sleeve is coupled to the bushing components in a manner that pulls the bushing components together during thermal expansion. Utilizing the disclosed load sustaining bushing, expansion of the load compensation sleeve occurs at a greater rate than the other bushing components and composite sandwich material, eliminating slop and maintaining a desired preload force on the composite sandwich material during high temperature operations.

Figure 1:
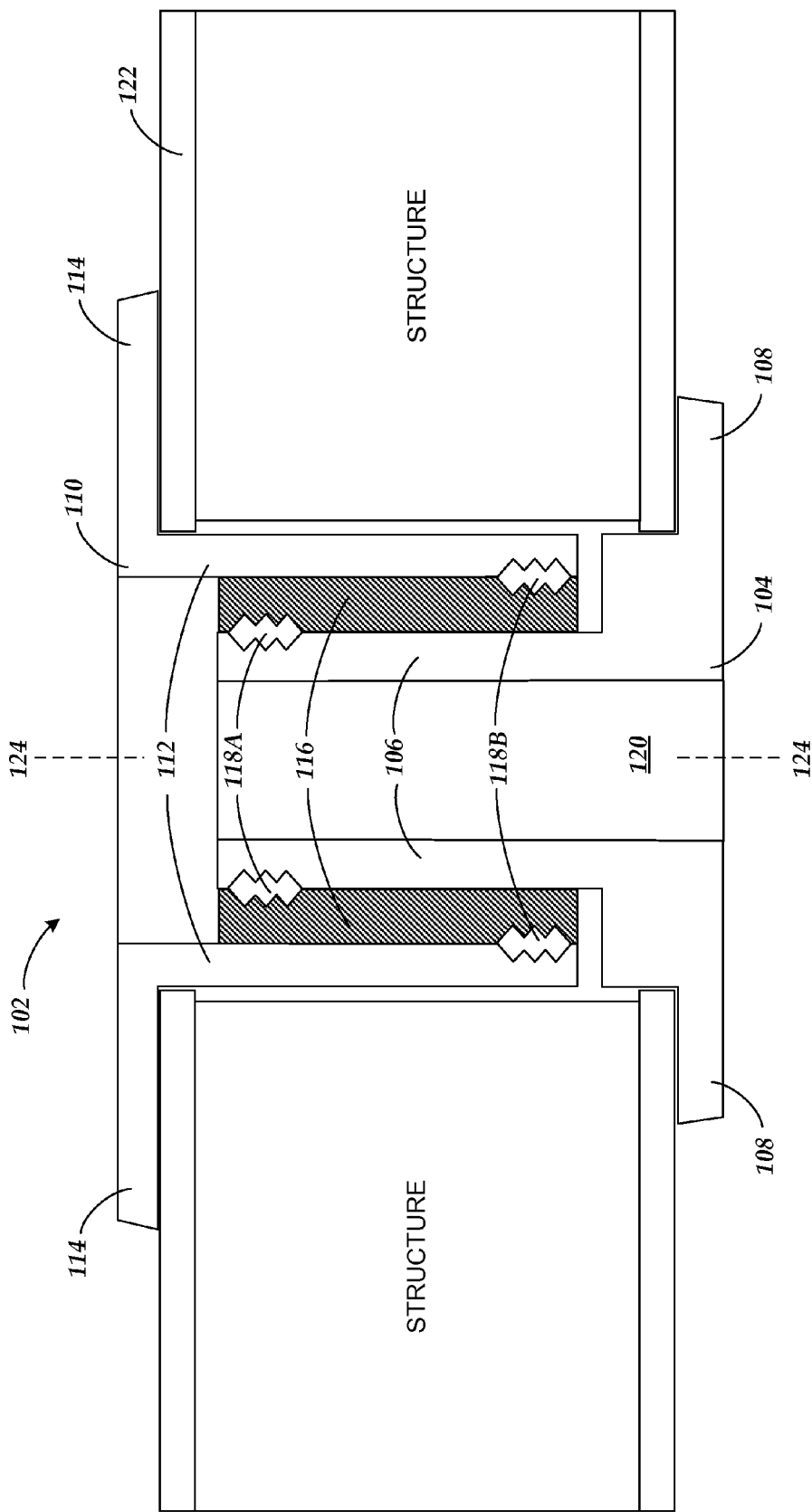
FIG. 1 is a cross-sectional view of a load sustaining bushing and composite sandwich structure according to various embodiments presented herein.
Figure 2:
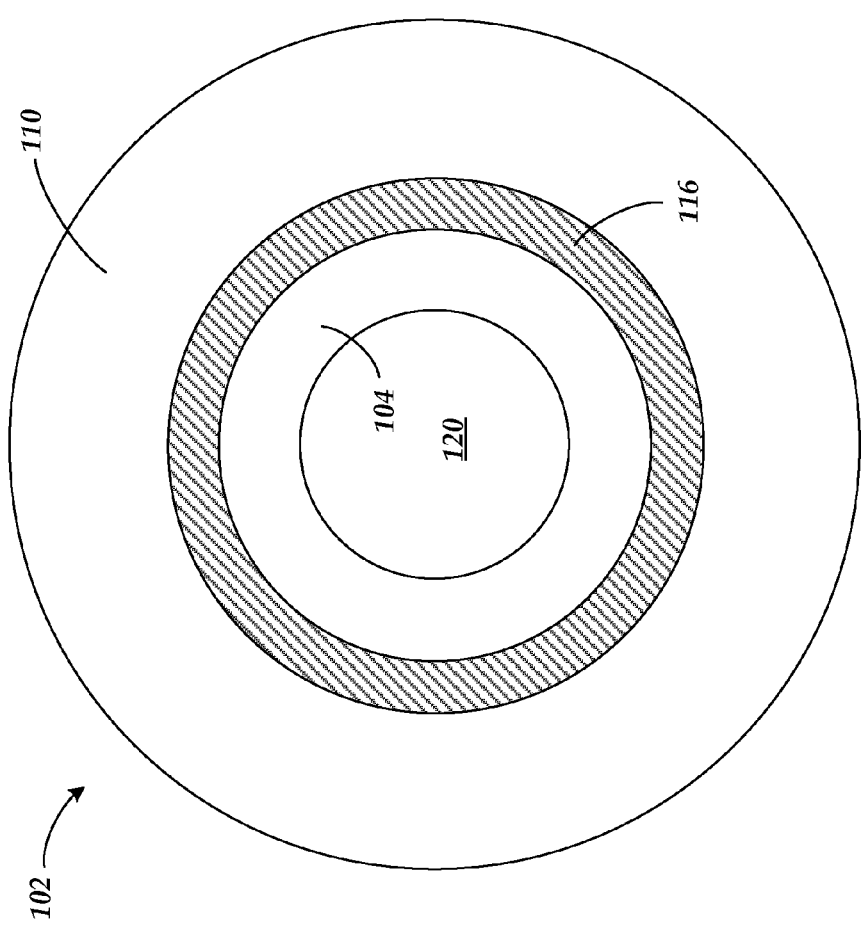
FIG. 2 is a top view of a load sustaining bushing according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, the load sustaining bushing will be described. Turning to FIGS. 1 and 2, cross-sectional and top views, respectively, of a load sustaining bushing 102 (hereinafter "bushing 102") is shown. According to this example, the bushing 102 includes an inner bushing component 104 and an outer bushing component 110, and is shown installed within a structure 122. As described above, the structure 122 may include a CMC material, another composite sandwich material, or even a non-composite material.

The inner bushing component 104 and outer bushing component 110 may each be substantially cylindrical in shape, defining an aperture 120 along a central axis 124 through the middle of the bushing 102. The inner bushing component 104 may include an inner wall 106 surrounding the aperture 120. The inner bushing component 104 may additionally include a first clamp tab 108 that extends substantially perpendicularly outward from one end of the inner wall 106. Similarly, the outer bushing component 110 may include an outer wall 112 and a second clamp tab 114 that extends substantially perpendicularly outward from an end of the outer wall 112. The first clamp tab 108 and the second clamp tab 114 are opposite and substantially parallel to one another, defining a bushing clamp length corresponding to a height of the structure 122 to be coupled to the bushing 102. The bushing clamp length will be described in greater detail below with respect to FIG. 3.

The outer bushing component 110 may be shaped and sized to encompass the inner bushing component 104. The inner and outer bushing components are coupled to one another via a load compensation sleeve 116 (hereinafter "sleeve 116"). The sleeve 116 may be substantially cylindrical in shape and sized according to the outside diameter of the cylindrical inner wall (inner wall 106) and to the inside diameter of the cylindrical outer wall (outer wall 112). When the bushing 102 is assembled, the sleeve 116 may be threaded to an exterior surface of the inner wall 106 of the inner bushing component 104 and to an inner surface of the outer wall 112 of the outer bushing component 110. In doing so, various embodiments may be configured such that the inner wall 106, sleeve 116, and outer wall 112 are vertically oriented, parallel, and adjacent to one another with the various components consecutively abutting one another as shown in FIG. 1. The result is a concentric arrangement of the inner bushing component 104, the sleeve 116, and the outer bushing component 110 as shown in FIG. 2.

According to one embodiment, the sleeve 116 is threaded in place around the exterior of the inner wall 106 via inner threads 118A positioned proximate to an end of the inner wall 106 opposite the first clamp tab 108. The outer wall 112 is threaded in place around the exterior of the sleeve 116 via outer threads 118B positioned proximate to an end of the outer wall 112 opposite the second clamp tab 114. As will become clear from the discussion below with respect to FIG. 3, the placement of the inner threads 118A and the outer threads 118B at opposite ends of the inner wall 106 and outer wall 112 allow the inner bushing component 104 and the outer bushing component 110 to overlap and pull toward one another as the sleeve 116 expands with an increase in temperature. It should be appreciated that any other suitable methods for coupling the inner bushing component 104, the sleeve 116, and the outer bushing component 110 may be used without departing from the scope of this disclosure.

Figure 3:
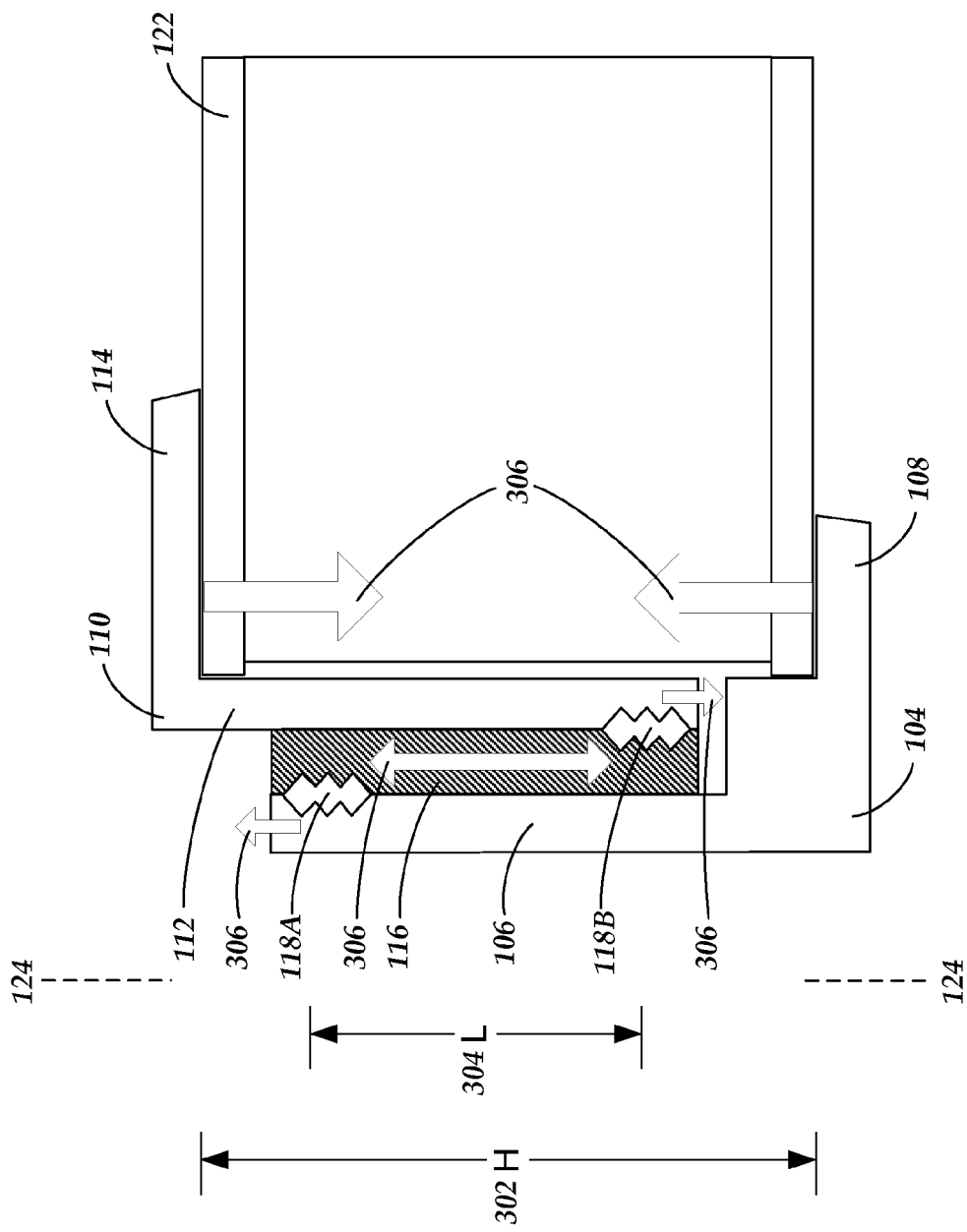
FIG. 3 is a partial cross-sectional view of a load sustaining bushing showing various forces imposed on the bushing as a result of thermal expansion according to various embodiments presented herein.

Turning now to FIG. 3, a partial cross-sectional view of a bushing 102 is shown to illustrate the various forces imposed on the bushing and resulting movement of the bushing components when subjected to increasing operating temperatures. For clarity, only one half of the cross-sectional shown in FIG. 1 is presented in FIG. 3. According to various embodiments, the height H of the structure 122 is also referred to as the bushing clamp length 302. As described above, the bushing clamp length 302 is the distance between the first clamp tab 108 and the second clamp tab 114. The distance L between the inner threads 118A and the outer threads 118B is depicted as the sleeve length 304. The bushing clamp length 302 and the sleeve length 304 will be described in greater detail below while demonstrating example implementations of a bushing 102.

Figure 4:
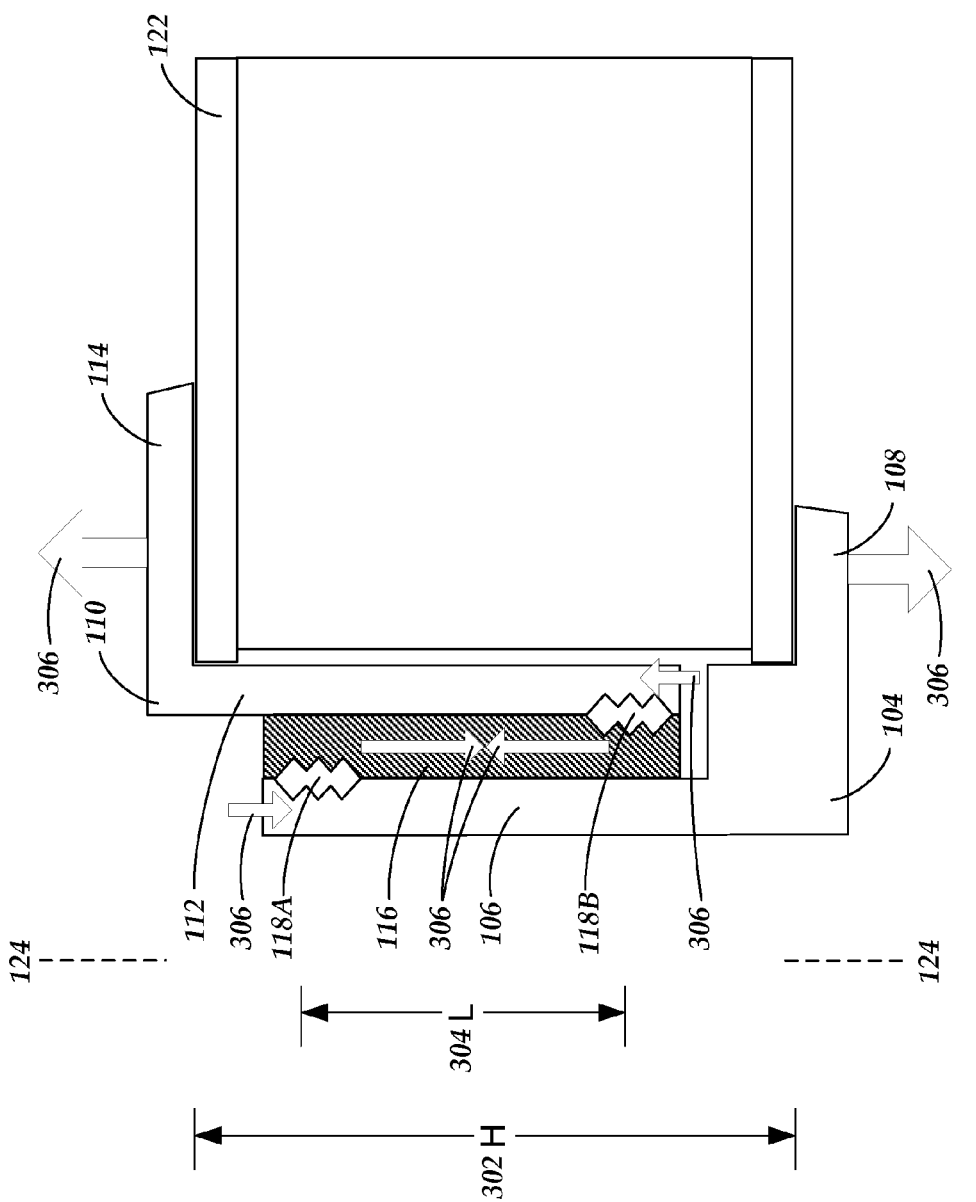
FIG. 4 is the partial cross-sectional view of the load sustaining bushing of FIG. 3 showing various forces imposed on the bushing as a result of thermal contraction according to various embodiments presented herein.

For the purposes of the examples shown in FIGS. 3 and 4, the terms "up" and "upward" may be used to describe the direction along the central axis 124 toward the top of the page. Similarly, the terms "down" and "downward" may be used to refer to the direction along the central axis 124 toward the bottom of the page. It should be understood that in practice, the bushing 102 may be configured in any orientation, including the reverse of the example shown such that the first clamp tab 108 of the inner bushing component 104 is positioned at the top of the page with the second clamp tab 114 of the outer bushing component 110 being positioned at the bottom of the page.

In addition, the terms "axial expansion," "thermal axial expansion," "axial contraction," "and thermal axial contraction" as used herein refer to expansion and contraction along the central axis 124 as a result of a temperature change, as indicated by the open arrows 306 depicted on the sleeve 116 in FIGS. 3 and 4. As shown in FIG. 3, because the sleeve 116 is coupled to the inner bushing component 104 via the inner threads 118A, the expansion of the sleeve 116 is effective to "pull," or translate, the inner bushing component 104 upward toward the structure 122, as indicated by the upward pointing open arrows 306. Similarly, because the sleeve 116 is coupled to the outer bushing component 110 via the outer threads 118B, the expansion of the sleeve 116 is effective to pull, or translate, the outer bushing component 110 downwards toward the structure 122, as indicated by the downward pointing open arrows 306.

In addition to the expansion experienced by the sleeve 116 during high temperature operations, the inner bushing component 104, the outer bushing component 110, and the structure 122 may also experience thermal expansion. In order to maintain the installed preload at high temperatures, the axial expansion of the sleeve 116 may be equal to the differential axial expansion of the inner bushing component 104, the outer bushing component 104, and the structure 122. As discussed above, various embodiments provide for a sleeve 116 having a higher CTE than the inner bushing component 104, the outer bushing component 110, and the structure 122. This characteristic of the sleeve 116 allows the sleeve 116 to expand a greater amount than the other bushing components and corresponding structure 122 under the same temperature conditions.

According to one embodiment, the structure 122 may have the lowest CTE of any material in the bushing 102. The inner bushing component 104 and the outer bushing component 110 may be manufactured from the same material, having a higher CTE than the structure 122, which may be a CMC sandwich panel, for example. Example materials for the inner bushing component 104 and the outer bushing component 110 include, but are not limited to, Inconel, Incalloy, titanium, or steel. The sleeve 116 may have the highest CTE of any component of the assembly, higher than the inner and outer bushing components, and higher than the structure 122. Example materials for the sleeve 116 include, but are not limited to, Inconel, steel, aluminum, or A286. In alternative embodiments, the inner bushing component 104 and the outer bushing component 110 may be manufactured from different materials, each having a CTE greater than the structure 122 and lower than the sleeve 116. Regardless of the materials selected for the various components of a bushing 102, this selection provides a sleeve 116 having a higher CTE than the other components.

FIG. 4 shows the partial cross-sectional view of the bushing 102 of FIG. 3. However, FIG. 4 is used to illustrate the various forces imposed on the bushing and resulting movement of the bushing components when subjected to decreasing operating temperatures. As seen by the open arrows 306, the effect of the higher CTE of the sleeve 116 as compared to the other bushing components is that it will compress a greater amount than the materials having a lower CTE when subjected to lower temperatures. Without the sleeve 116, a conventional bushing would compress more than the structure 122, which would undesirably increase the load placed on the structure 122 by the bushing 102. Utilizing the various embodiments described herein, just as the sleeve 116 is configured to pull the inner bushing component 104 and outer bushing component 110 together when subjected to high temperatures, the sleeve 116 pushes these components apart when subjected to low temperatures. In this manner, the load imposed by the bushing 102 on the structure 122 may be approximately sustained throughout a wide range of operating temperatures.

According to various embodiments, the minimum CTE of the sleeve 116 may be calculated using the process described below. As stated above, in order to maintain the installed preload, the axial expansion and contraction of the sleeve 116 should be equal to the differential axial expansion and contraction of the inner bushing component 104, the outer bushing component 104, and the structure 122, which is represented by Equation 1 below. Equation 1 may be solved to provide the minimum sleeve CTE, assuming that the sleeve length 304 is less than the bushing clamp length 302 (L<H), as shown in Equation 2. After determining the minimum sleeve CTE for the particular application, the material of the sleeve 116 may be selected. For the selected sleeve material, Equation 1 may then be solved to determine the applicable sleeve length 304, as shown in Equation 3.

$$\Delta T \times L \times \alpha_{sleeve} = \Delta T \times [(H+L) \times \alpha_{bushing} - H \times \alpha_{structure}] \quad \text{Equation 1}$$

$$\alpha_{sleeve} > (2 \times \alpha_{bushing}) - \alpha_{structure} \quad \text{Equation 2}$$

$$L = H \times (\alpha_{bushing} - \alpha_{structure})/(\alpha_{sleeve} - \alpha_{bushing}) \quad \text{equation 3}$$

Where:
$\Delta T$ is the temperature change;
L is the sleeve length 304;
H is the bushing clamp length 302; and
$\alpha$ is the CTE.

As a first illustrative example utilizing the equations and process described above, the structure 122 may include an Oxide CMC sandwich panel having a height H, or bushing clamp length 302, of 0.6 inches. The inner bushing component 104 and the outer bushing component 110 may each be manufactured from Ti-6242s. Solving Equations 1-3 to determine an appropriate material and sleeve length 304 (L) for the sleeve 116:

H=0.6 inches
Peak temperature=1200 F
Structure 122=Oxide CMC panel having CTE@ 1200 F=4.0e-6 in/in/F
Bushing components Ti-6242s having CTE@ 1200 F=5.6e-6 in/in/F
Equation 2—solve to get minimum CTE for the sleeve=$\alpha_{sleeve}$>(2×5.6e-6 in/in/F)−4.0e-6 in/in/F=$\alpha_{sleeve}$>7.2e-6 in/in/F Using the determined minimum CTE of 7.2e-6 in/in/F, the material for the sleeve 116 may be selected, which in this example may be Inconel 718 having a CTE @ 1200 F=8.3e-6 in/in/F. Utilizing this CTE for the sleeve 116 and Equation 3, the length L of the sleeve 116, or sleeve length 304, may be determined as follows:

$$L=0.6\times(5.6-4.0)/(8.3-5.6)=0.356 \text{ inches} \quad \text{Equation 3}$$

For illustrative purposes, a second example is as follows:
H=1.4 inches
Peak temperature=1200 F
Structure 122=C/SiC CMC panel having CTE @ 1200 F=1.3e-6 in/in/F
Bushing components Incolloy 909 having CTE @ 1200 F=5.5e-6 in/in/F
Equation 2—solve to get minimum CTE for the sleeve=$\alpha_{sleeve}$>(2×5.5e-6 in/in/F)−1.3e-6 in/in/F=$\alpha_{sleeve}$>9.7e-6 in/in/F
Select A286 with $\alpha_{sleeve}$=11.2e-6 in/in/F @ 1200 F $$L=1.4\times(5.5-1.3)/(11.2-5.5)=1.032 \text{ inches} \quad \text{Equation 3}$$

For illustrative purposes, a third example is as follows:
H=1.5 inches
Minimum temperature=−400 F
Structure 122=Gr/Epoxy PMC panel having CTE @ −400 F=0.8e-6 in/in/F
Bushing components Stainless AM-355 having CTE @ −400 F=4.5e-6 in/in/F
Equation 2—solve to get minimum CTE for the sleeve=$\alpha_{sleeve}$>(2×4.5e-6 in/in/F)−0.8e-6 in/in/F=$\alpha_{sleeve}$>8.2e-6 in/in/F
Select Aluminum Alloy 2024 with $\alpha_{sleeve}$=8.5 in/in/F@ −400 F $$L=1.5\times(4.5-0.8)/(8.5-4.5)=1.388 \text{ inches} \quad \text{Equation 3}$$

It should be understood that the above examples are for illustrative purposes only and are not to be construed as limiting to this disclosure in any way.

Figure 5:
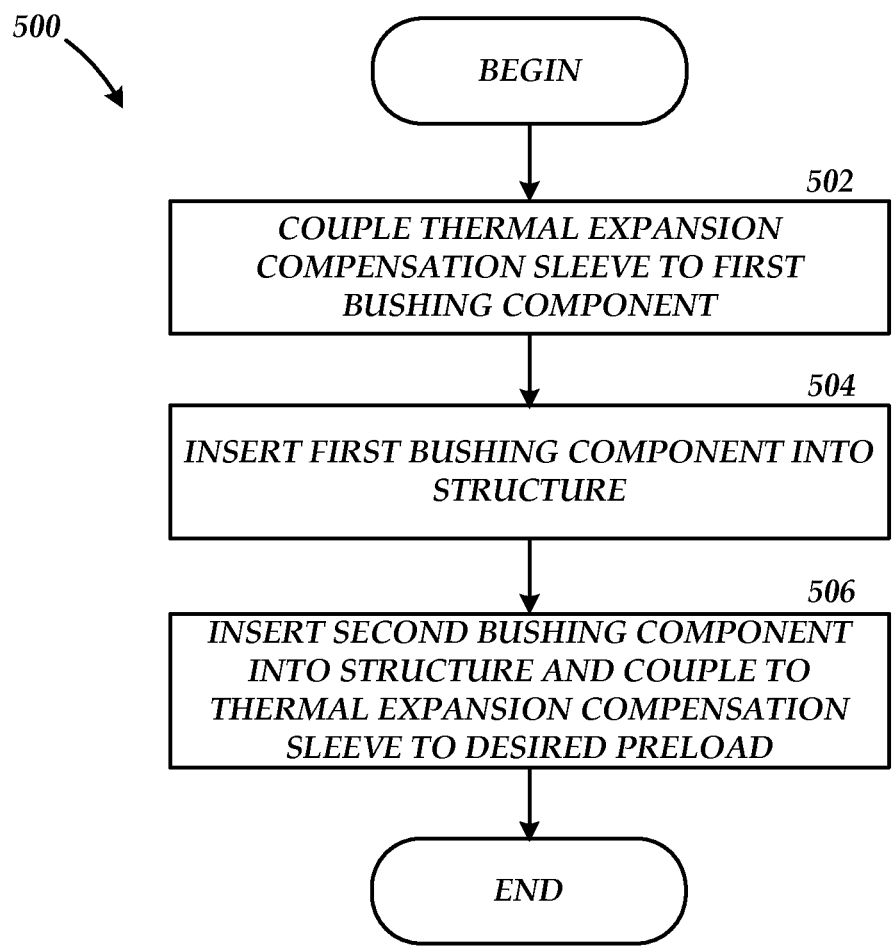
FIG. 5 is a process flow diagram illustrating a method for utilizing a load sustaining bushing according to various embodiments presented herein.

Turning now to FIG. 5, an illustrative routine 500 for utilizing a load sustaining bushing will now be described in detail. It should be appreciated that more or fewer operations may be performed than shown in the figures and described herein. These operations may also be performed in a different order than those described herein.

The routine 500 begins at operation 502, where a sleeve 116 is coupled to a first bushing component. According to one embodiment, the sleeve 116 may be threaded onto the inner threads 118A of the inner bushing component 104. Other suitable coupling means may alternatively be utilized. At operation 504, the first bushing component and coupled sleeve 116 are inserted into the applicable aperture in the structure 122. It should be appreciated that operation 502 and 504 may be reversed so that the first bushing component is inserted into the structure 122, followed by threading or otherwise coupling the sleeve 116 to the first bushing component.

From operation 504, the routine 500 continues to operation 506, where the second bushing component is inserted into the structure 122 and coupled to the sleeve 116 to create the desired preload on the structure 122. As an example, the outer bushing component 110 may be positioned within the applicable aperture of the structure 122 containing the inner bushing component 104 and sleeve 116, and threaded onto the outer threads 118B until the second clamp tab 114 is properly seated abutting the external surface of the structure 122. After the bushing 102 installation is complete, the bushing 102 and corresponding structure 122 is ready for high temperature operations while maintaining the desired preload, and the routine 500 ends.

Based on the foregoing, it should be appreciated that technologies for providing a load sustaining bushing that maintains a preload associated with a corresponding structure at a wide variety of dynamic operating temperatures have been presented herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A bushing, comprising:
    an inner bushing component having a cylindrical inner wall and a first clamp tab substantially perpendicular to the cylindrical inner wall and configured to abut a surface of a structure to be coupled with the bushing;
    an outer bushing component having a cylindrical outer wall and a second clamp tab substantially perpendicular to the cylindrical outer wall and configured to abut an opposing surface of the structure to couple the structure with the bushing, the first and second clamp tabs defining a distance between the inner bushing component and the outer bushing component; and
    a load compensation sleeve having a cylindrical shape and sized to abut an exterior surface of the cylindrical inner wall and an inner surface of the cylindrical outer wall, the load compensation sleeve coupling the inner bushing component to the outer bushing component and having a coefficient of thermal expansion (CTE) that is greater than a CTE of the inner bushing component and a CTE of the outer bushing component,
    wherein the exterior surface of the cylindrical inner wall comprises threads positioned proximate to an end opposite the first clamp tab, wherein the inner surface of the cylindrical outer wall comprises threads positioned proximate to an end opposite the second clamp tab, and wherein the load compensation sleeve is coupled to the inner bushing component and the outer bushing component via the threads on the cylindrical inner wall and the threads on the cylindrical outer wall, and
    wherein the first bushing component, the load compensation sleeve, and the second bushing component are configured such that thermal axial expansion or contraction of the load compensation sleeve substantially maintains the distance between the inner bushing component and the outer bushing component over a range of operational temperatures.

2. The bushing of claim 1, wherein the inner bushing component and the outer bushing component comprise substantially equivalent materials and corresponding substantially equivalent CTEs.

3. The bushing of claim 1, wherein the load compensation sleeve comprises sleeve length that is less than the distance between the inner bushing component and the outer bushing component.

4. A bushing, comprising:
    an inner bushing component having an inner wall and a first clamp tab extending substantially perpendicular from the inner wall;
    an outer bushing component having an outer wall sized to encompass the inner wall when positioned around the inner bushing component, the outer bushing component having a second clamp tab extending substantially perpendicular from the outer wall such that the second clamp tab is spaced apart from and substantially parallel to the first clamp tab to define a bushing clamp length comprising approximately a height of a structure to be coupled with the bushing and such that the first clamp tab and the second clamp tab are configured to abut opposing surfaces of the structure; and
    a load compensation sleeve disposed between and coupling the inner bushing component to the outer bushing component,
    wherein the structure comprises a CTE lower than a CTE of the load compensation sleeve, inner bushing component, and outer bushing component, and wherein the CTE of the load compensation sleeve is greater than the CTE of the inner bushing component and greater than the CTE of the outer bushing component.

5. The bushing of claim 4, wherein the inner bushing component and the outer bushing component comprise substantially equivalent materials and corresponding substantially equivalent CTEs.

6. The bushing of claim 4, wherein the load compensation sleeve comprises a sleeve length that is less than the bushing clamp length.

7. The bushing of claim 4, wherein the inner wall, the outer wall, and the load compensation sleeve each comprise a cylindrical shape, and wherein the load compensation sleeve is sized to abut and couple to an exterior surface of the inner wall and an inner surface of the outer wall via threads.

8. The bushing of claim 4, wherein a thermal axial expansion or contraction of the load compensation sleeve is substantially equivalent to a differential axial expansion or contraction of the inner bushing component, the outer bushing component, and the structure.

9. A bushing, comprising:
    an inner bushing component having a cylindrical inner wall and a first clamp tab substantially perpendicular to the cylindrical inner wall and configured to abut a surface of a structure to be coupled with the bushing;
    an outer bushing component having a cylindrical outer wall and a second clamp tab substantially perpendicular to the cylindrical outer wall and configured to abut an opposing surface of the structure to couple the structure with the bushing, the first and second clamp tabs defining a distance between the inner bushing component and the outer bushing component; and a load compensation sleeve coupling the inner bushing component to the outer bushing component and having a CTE that is greater than a CTE of the inner bushing component and a CTE of the outer bushing component, wherein the inner bushing component and the outer bushing component abut opposing surfaces of a structure such that the distance between the inner bushing component and the outer bushing component comprises a height of the structure, and wherein the structure comprises a CTE lower than the CTE of the load compensation sleeve, inner bushing component, and outer bushing component, and wherein the inner bushing component, the load compensation sleeve, and the outer bushing component are configured such that thermal axial expansion or contraction of the load compensation sleeve substantially maintains the distance between the inner bushing component and the outer bushing component over a range of operational temperatures.

10. The bushing of claim 9, wherein the structure comprises a composite sandwich structure.

11. The bushing of claim 10, wherein the composite sandwich structure comprises a ceramic matrix composite (CMC) material.

12. The bushing of claim 9, wherein the thermal axial expansion or contraction of the load compensation sleeve is substantially equivalent to a differential axial expansion or contraction of the inner bushing component, the outer bushing component, and the structure.

13. A method for utilizing a load sustaining bushing, comprising:

coupling a first bushing component and a load compensation sleeve by threading the load compensation sleeve onto an external surface of a cylindrical wall of the first bushing component;

inserting the first bushing component and the load compensation sleeve into an aperture of a structure; and coupling a second bushing component and the load compensation sleeve by threading the second bushing component onto an external surface of the load compensation sleeve such that the first bushing component and the second bushing component abut opposing surfaces of the structure to create a preload that is substantially maintained during thermal expansion or contraction of the first bushing component, the second bushing component, the load compensation sleeve, and the structure.

14. The method of claim 13, wherein the structure comprises a first CTE, the first bushing component and the second bushing component each comprise a second CTE greater than the first CTE, and the load compensation sleeve comprises a third CTE greater than the second CTE.

15. The method of claim 13, further comprising heating or cooling the first bushing component, the second bushing component, the load compensation sleeve, and the structure while substantially maintaining the preload imposed on the opposing surfaces of the structure by the first bushing component and the second bushing component.

* * * * *